US008821042B2

United States Patent
Sato

(10) Patent No.: US 8,821,042 B2
(45) Date of Patent: Sep. 2, 2014

(54) OPTICAL MODULE WITH LENS ASSEMBLY DIRECTLY MOUNTED ON CARRIER BY SOLDERING AND LASER DIODE INDIRECTLY MOUNTED ON CARRIER THROUGH SUB-MOUNT

(75) Inventor: Shunsuke Sato, Yokohama (JP)

(73) Assignee: Sumitomo Electic Industries, Ltd., Osaka-shi (JP)

( * ) Notice: Subject to any disclaimer, the term of this patent is extended or adjusted under 35 U.S.C. 154(b) by 73 days.

(21) Appl. No.: 13/536,794

(22) Filed: Jun. 28, 2012

(65) Prior Publication Data

US 2013/0011104 A1    Jan. 10, 2013

(30) Foreign Application Priority Data

Jul. 4, 2011 (JP) .................................. 2011-147877
Sep. 20, 2011 (JP) .................................. 2011-204389

(51) Int. Cl.
*G02B 6/00* (2006.01)
*G02B 6/36* (2006.01)

(52) U.S. Cl.
USPC ........................................... 385/93; 385/147

(58) Field of Classification Search
USPC .......... 385/88–95, 147; 257/79, 80, 680, 678;
372/96, 99, 38.1; 438/121–122
See application file for complete search history.

(56) References Cited

U.S. PATENT DOCUMENTS

| 4,803,689 | A | * | 2/1989 | Shibanuma | 372/36 |
| 5,195,155 | A | * | 3/1993 | Shimaoka et al. | 385/90 |
| 5,227,646 | A | * | 7/1993 | Shigeno | 257/80 |
| 6,547,455 | B1 | * | 4/2003 | Hashizume | 385/93 |
| 6,568,864 | B1 | * | 5/2003 | Ishimaru | 385/93 |
| 6,625,185 | B2 | | 9/2003 | Ishimaru | |
| 6,955,483 | B2 | * | 10/2005 | Narayan | 385/94 |
| 7,004,644 | B1 | * | 2/2006 | Johnson | 385/89 |
| 7,977,127 | B2 | * | 7/2011 | Kanemoto et al. | 438/27 |
| 2011/0217798 | A1 | * | 9/2011 | Kanemoto et al. | 438/25 |

FOREIGN PATENT DOCUMENTS

JP        2002-141598        5/2002

* cited by examiner

*Primary Examiner* — Akm Enayet Ullah
(74) *Attorney, Agent, or Firm* — Venable LLP; Michael A. Sartori; George L. Howarah

(57) ABSTRACT

An optical module is disclosed where the module includes an optical active device mounted on a carrier via a sub-mount, and a lens assembly mounted on the carrier and optically coupled with the device and an external fiber. A feature of the optical module is that the lens assembly has a metalized portion fixed to the carrier by the soldering.

13 Claims, 11 Drawing Sheets

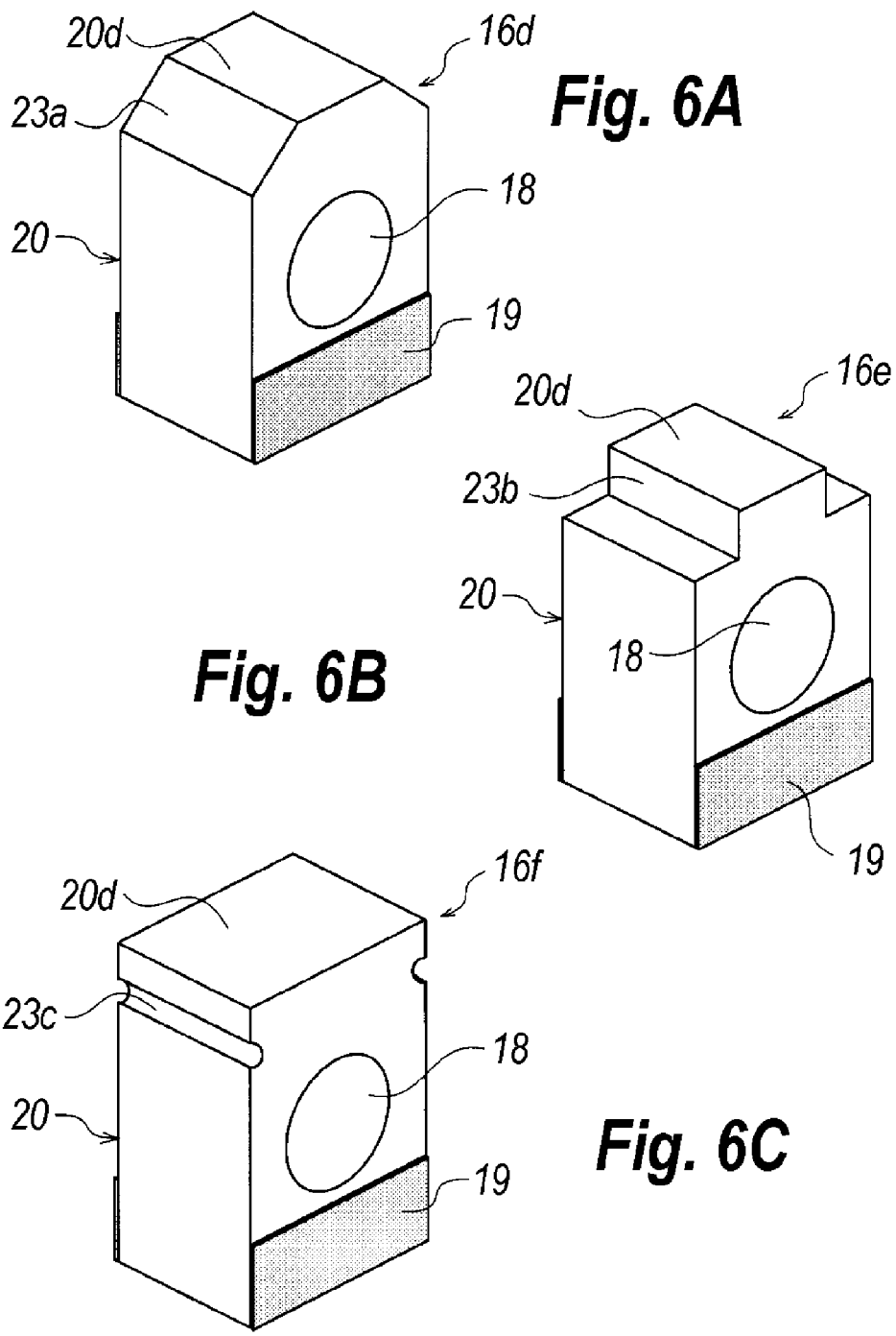

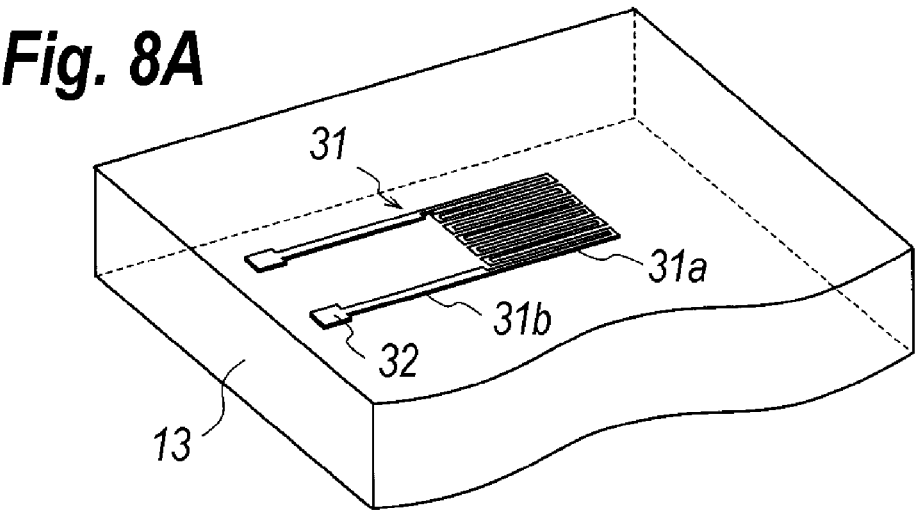
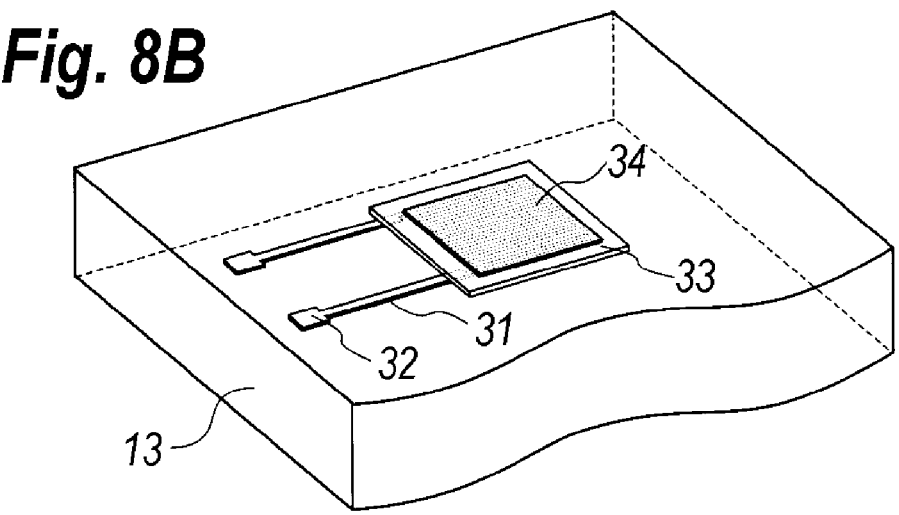
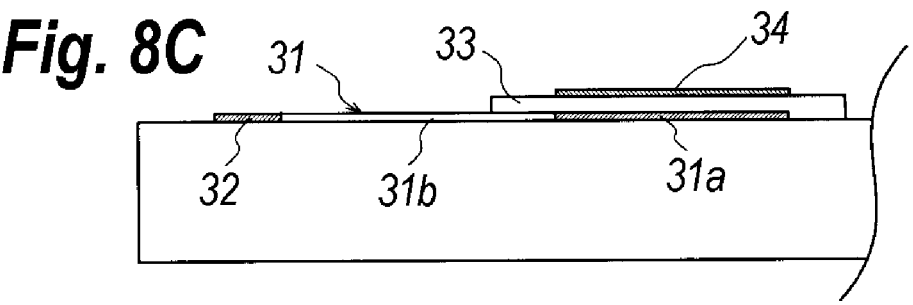

OPTICAL MODULE WITH LENS ASSEMBLY DIRECTLY MOUNTED ON CARRIER BY SOLDERING AND LASER DIODE INDIRECTLY MOUNTED ON CARRIER THROUGH SUB-MOUNT

BACKGROUND OF THE INVENTION

1. Field of the Invention

The present invention relates to an optical module with a lens assembly which is soldered to a carrier to mount the LD.

2. Related Prior Arts

The optical communication system is implemented with a transmitter module as an optical signal source. The transmitter module installs a semiconductor laser diode (hereafter denoted as LD) therein. The signal light emitted by the LD is concentrated with a lens and enters an optical fiber. The lens is necessary to be coupled optically with the LD and the optical fiber. A conventional technique to install the lens into the transmitter module uses the YAG laser welding after it is optical aligned with the LD and the optical fiber because the YAG laser welding causes substantially no displacement of the once aligned lens. However, the YAG laser welding inherently brings cost ineffective components to be welded.

SUMMARY OF THE INVENTION

An aspect of the present application relates to an optical module that comprises at least one semiconductor optical device, at least one lens assembly which is optically coupled with the semiconductor optical device, and a carrier to mount the optical device and the lens assembly thereof. A feature of an embodiment of the application is that the lens assembly has a metalized surface fixed to the carrier by a solder.

The metalized surface of the lens assembly is provided on at least side surface of the lens assembly to form a solder fillet thereon. Because the solder fillet is formed, the sharing tolerance of the lens assembly against the carrier may be enhanced. The metalized surface may be provided in a bottom of the lens assembly facing the carrier, which may further enhance the sharing tolerance of the lens assembly.

In order to facilitate the soldering of the lens assembly to the carrier, the carrier may provide a metal layer in a portion where the lens assembly is soldered, and a heater beneath the metal layer. For further facilitation of the soldering, the carrier may provide a hollow in a portion of a back surface thereof corresponding to the heater. The hollow may increase the thermal resistance from the heater to the back surface of the carrier, which may concentrate the power generated by the heater primarily on to metal layer above the heater to further facilitate the soldering, or melting the solder.

The optical module according to an embodiment may include a plurality of LDs each coupled with an optical multiplexer through respective lens assemblies. When the size of the housing is comparable to that installing a single LD, the LDs and the lens assemblies are tightly arranged within the housing. Then, the YAG laser welding conventionally applied to assemble and fix the components in the housing is unable to be processed. The lens assemblies, and/or the optical multiplexer may be fixed on the carrier by soldering according to an embodiment of the present application.

BRIEF DESCRIPTION OF THE DRAWINGS

The foregoing and other purposes, aspects and advantages will be better understood from the following detailed description of a preferred embodiment of the invention with reference to the drawings, in which:

FIGS. 6A to 6C show various lens assembly according to embodiments of the invention;

FIGS. 8A and 8B are perspective views of the carrier according to another embodiment of the invention, and FIG. 8C is a cross section thereof;

DETAILED DESCRIPTION OF PREFERRED EMBODIMENTS

Figure 1:
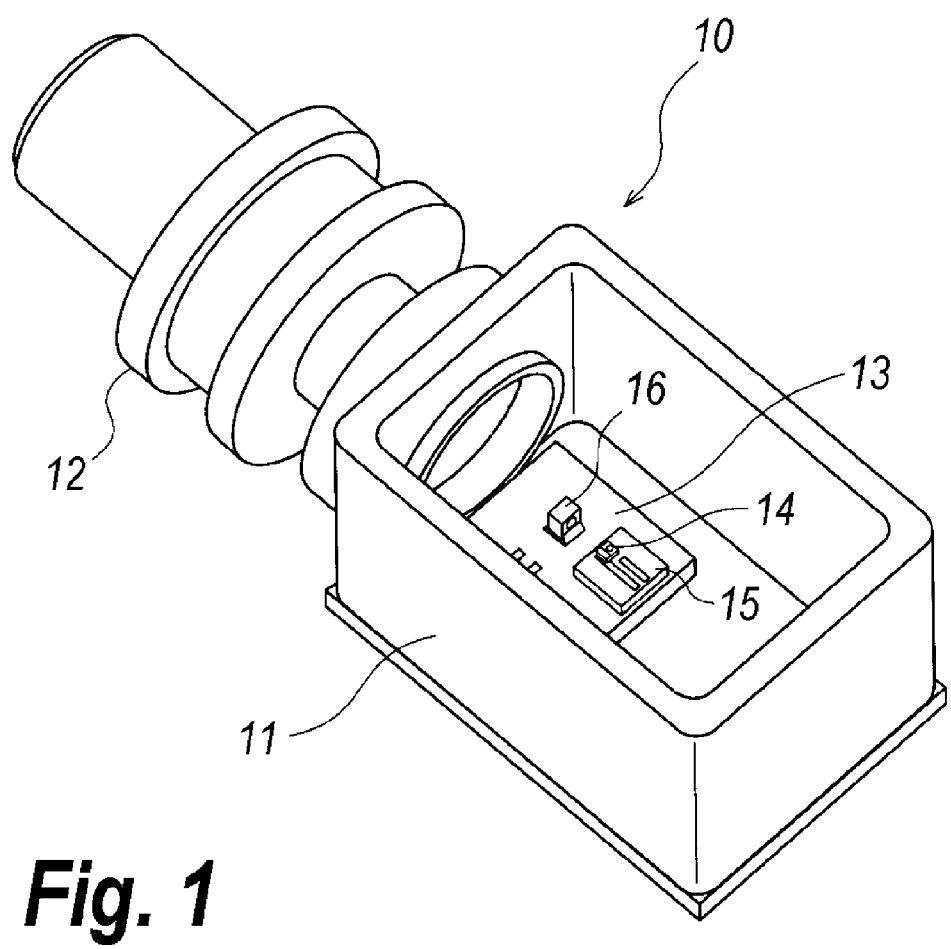
FIG. 1 is a perspective view showing an optical module according to an embodiment of the invention, where the optical module omits a ceiling to show an inside thereof.
Figure 2A:
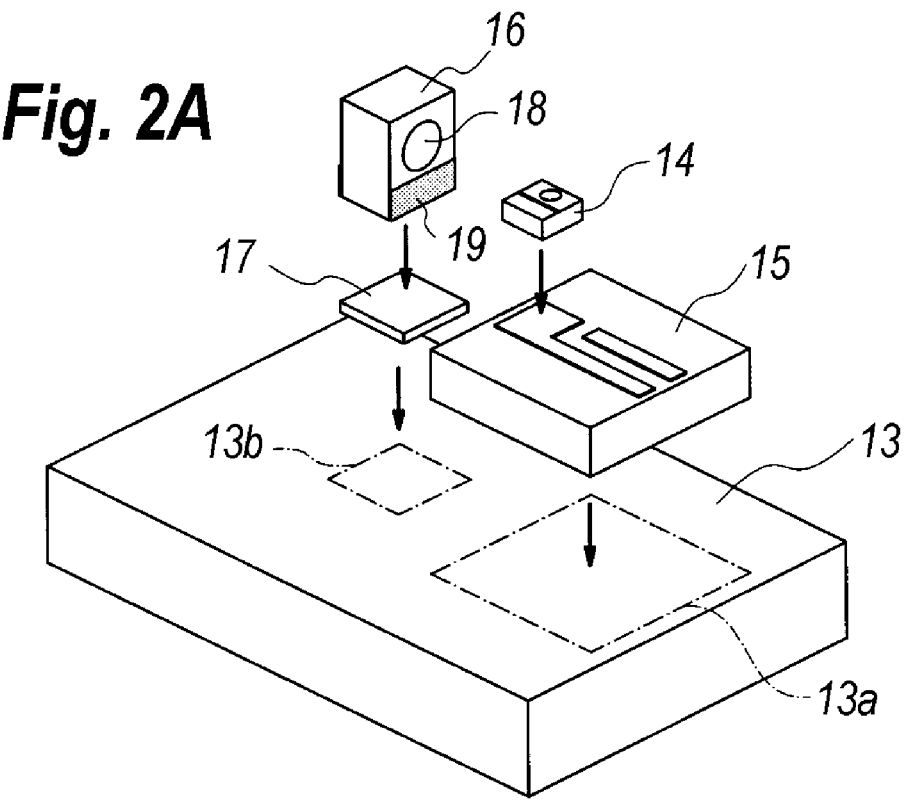
FIG. 2A is an exploded view of a primary portion of the optical module shown in FIG. 1.
Figure 2B:
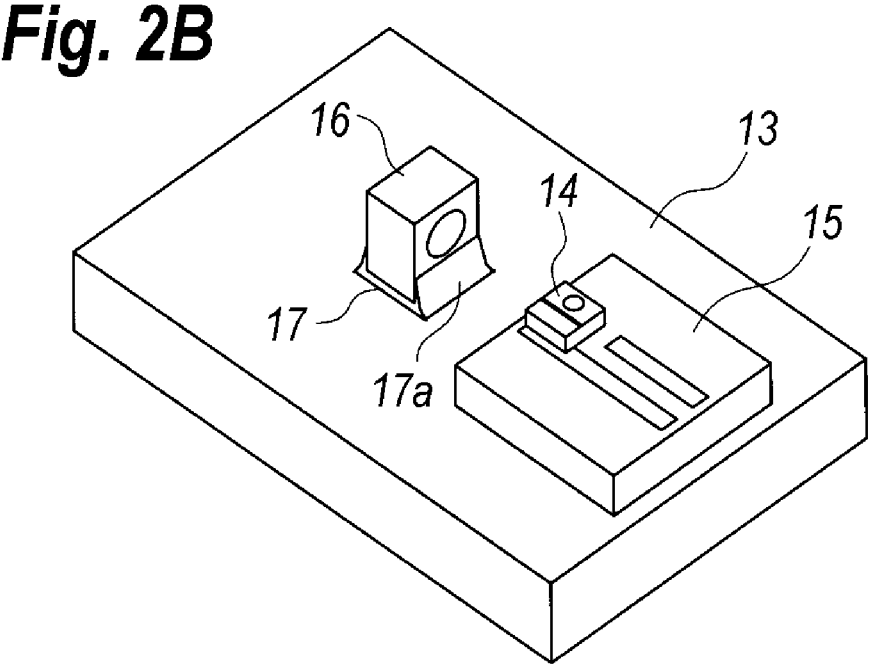
FIG. 2B is a perspective view showing the assembled primary portion.

Some preferred embodiments according to the present invention will be described as referring to drawings. In the description of the drawings, numerals or symbols same or similar to each other will refer to elements same or similar to each other without overlapping explanations. FIG. 1 is a perspective view of an optical module 10, where a ceiling thereof is omitted to show an inside thereof. FIG. 2A is an exploded view of a primary portion of the optical module 1 and FIG. 2B is a perspective view showing an assembled primary portion. The optical module 10 shown in FIG. 1, where the optical module 10 is a type of a transmitter optical module that installs an LD as a light-emitter device, includes a box housing 11, an optical coupling portion 12, and a primary portion installed within the box housing 11. The primary portion includes the LD 14 mounted on a carrier 13 via a sub-mount 15, and a lens 18 also mounted on the carrier 13 via a lens assembly 16. A feature of the primary portion is that the lens assembly has a metalized surface 19 along which a solder fillet is crept up.

The box housing 11 has a rectangular shape to enclose the primary portion therein. The coupling portion 12 to couple an external fiber set therein, which is not shown in the figures, optically with the LD 14 mounted on the sub-mount 15. That is, light emitted from the LD 14 enters an end of the external fiber concentrated by the lens 18.

The box housing 11 may also enclose therein a thermo-electric controller (hereafter denoted as TEC) to control a temperature of the LD 14, a thermistor to detect the temperature of the LD 14, an optical isolator to prevent light scattered within the housing from entering back the LD 14, and a driver to drive the LD 14 electrically. The housing 11 provides a plurality of lead terminals, which is not shown in FIG. 1, to communicate electrically with external apparatuses of the optical module 10. The housing 11 may be air-tightly sealed as an atmosphere thereof is replaced in dry nitrogen, which may enhance the reliability of the LD 14, the lens 18, optical components, and so on enclosed within the box housing 11.

The carrier 13 in the primary portion of the optical module 10 may mount the LD 14 and the lens 18 supported by the lens assembly 16, as shown in FIGS. 2A and 2B. The LD 14 may be mounted on an area 13a in the carrier 13 via the sub-mount 15, which may be made of electrically insulating material such as ceramics. The mounting of the LD 14 on the sub-mount 15, and the mounting of the sub-mount 15 on the carrier 13 may use a solder made of eutectic metal, such as gold-germanium (AuGe), gold-tin (AuSn), tin-silver-copper (SnAgCu), and so on. AuSn eutectic metal is generally selected.

The lens assembly 18 may be integrally formed with the lens 18 and have the metalized surface 19. The lens assembly 18 is assembled on an area 13b of the carrier 13 as melting the solder sheet 17 inserted between the lens assembly 18 and the carrier 13. Specifically, after the LD 14 is mounted on the carrier 13, the lens assembly 16 with the lens 18 is optically aligned on the carrier 13 along three axes to get a preset condition as practically activating the LD 14 by supplying current thereto and monitoring light emitted from the LD 14 and passing the lens 18 directly by an apparatus such as an infrared camera or by a power meter via the external fiber. During the alignment of the lens assembly 16, the lens assembly 16 may be manipulated by, for instance, a collet and the solder sheet 17 is melted. After the alignment of the lens assembly 16 with the lens 18, the sheet is solidified as the lens assembly 16 is held in an optimum position. The process for aligning the lens assembly 16 is preferably carried out in an apparatus to melt the solder sheet 17 within nitrogen atmosphere or reducing atmosphere to remove oxidized portion of the melted solder sheet 17. The collet supporting the lens assembly 16 is preferable to release the lens assembly 16 after the solder sheet 17 is fully solidified to prevent the misalignment of the lens assembly 16 by the hardening shrinkage of the solder sheet 17.

When the solder sheet 17 is cooled down, the lens assembly 16 is rapidly cooled down to a temperature slightly lower than the melting point of the solder sheet 17 to change the phase of the solder sheet 17 from the liquid to the solid, then gradually cooled down to a room temperature. When the solder sheet 17 is cooled down from the liquid phase rapidly to the room temperature, the shrinkage due to the phase change and the shrinkage depending on the liner expansion coefficient concurrently occur, which increases the misalignment of the lens assembly 16 pulled by the lens assembly 16.

The solder sheet 17 for the lens assembly 16 is preferably to have a melting point lower than that of a solder applied to fix the LD 14 to the sub-mount 15, and the sub-mount 15 to the carrier 13. The soldering of the lens assembly 16 to the carrier 13 via the solder sheet 17 may cause substantially no effect to the fixing of the LD 14 and the sub-mount 15. The sheet may be a eutectic metal of, for instance, solder of AuSn, SnAgCu, SnCu, SnSb, SnZn, SnBi, and so on. When the LD 14 and/or the sub-mount 15 use AnSn, the solder sheet 17 may be SnAg, and/or SnAgCu whose melting point is next lower than that of AuSn.

The solder sheet 17 may be prepared on the carrier 13, that is, the solder sheet 17 may be formed on the carrier 13 as a metal pattern in advance to the soldering, or, the solder sheet 17 may have a type op a pellet put between the lens assembly 16 and the carrier 13 just before the soldering. The solder sheet 17 preferably has an amount to rise the metalized surface 19 in addition to fill a gap formed between the lens assembly 16 and the area 13a. When the solder sheet 17 is prepared on the carrier 13 in advance to melt it, the solder sheet 17 preferably has a size substantially equal to a size of the area 13a and the thickness thereof is one to three times larger than the gap, or, in a case the solder sheet 17 has a thickness less than the gap, the size thereof is preferably one to twice of that of the area 13a. When the solder sheet 17 is prepared by a type of the pellet, the size and the thickness thereof are similar to those described above.

FIGS. 3A to 6C show arrangements of the lens assembly 16 and substrates to form the lens assembly 16. The lens assemblies, 16a to 16f, has a body 20 with substantially rectangular shape. The lens assembly 16 has the lens 18 in a center thereof and the metalized surface 19 in a lower side. The rectangular lens assembly 16 may facilitate the production thereof. Specifically, as shown in the figures, a substrate 25 may be prepared where a plurality of rectangular lens assemblies 16 is arranged in rows and columns to form the lens 18 and the metalized surface 19 therein. Then, the substrate 25 may be cut in respective chips of the lens assembly 16.

The lens 18, which may be a convex lens protruding from the front surface 20a, or the rear surface 20b, may be formed by casting, or techniques often used in the semiconductor processing. When the casting is applied thereto, preparing a casting die with a hollow, whose curvature follows the curvature of the convex lens 18; filling the hollow with a material for the lens 18, or the lens assembly 16, and pressing the die, the lens assembly 16 with the convex lens 18 whose curvature is reflected from the casting die. In a case of the semiconductor processing, a substrate for the lens assembly 16 is first processed by the photolithography to form patterns for the convex lens 18, then to carry out the etching or milling to remove portions not covered by the lens patters. A condition of a hard etching and hard curing of a photoresist formed in the photolithography may etch portions covered by the photoresist and leave convex lenses 18 on the surface of the substrate. The metalized surface 19 may be formed by physical vapor deposition (PVD), chemical vapor deposition (CVD), metal plating, and so on. The metalized surface 19 is prepared in at least one of the bottom surface 20c facing the carrier 13, the lower potions, not extending in the lens 19, of the front surface 20a, and those of the rear surface 20b.

Figure 3A:
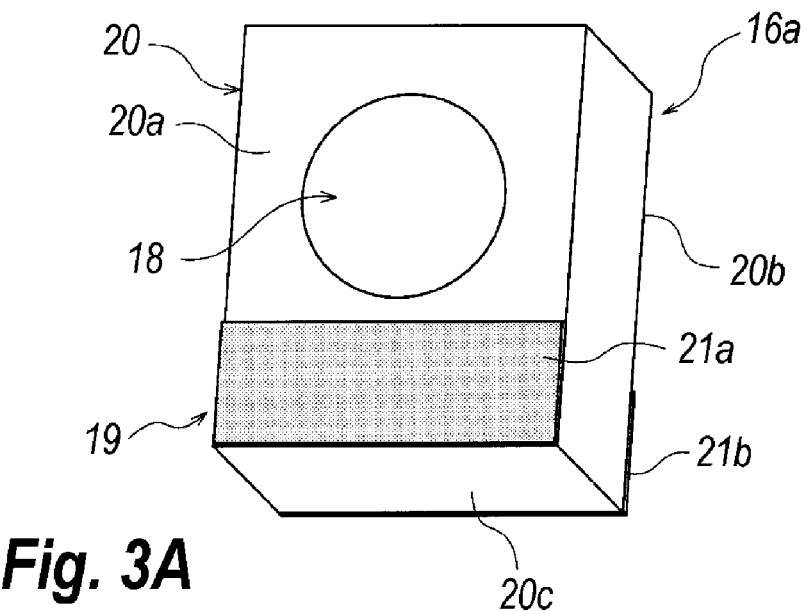
FIG. 3A shows an individual lens assembly according to an embodiment of the invention.

The lens assembly 16a shown in FIG. 3A provides the metals, 21a and 21b, in the front surface 20a and the rear surface 20b, respectively, to form the metalized surface 19. Two surfaces, 20a and 20b, each make a right angle to the bottom surface 20c facing the carrier 13. The lens assembly 16a may be soldered with and fixed to the carrier 13 by the solder fillet stuck out from a gap between the bottom surface 20c and the carrier 13 and extending to the metalized surface 19.

Figure 3B:
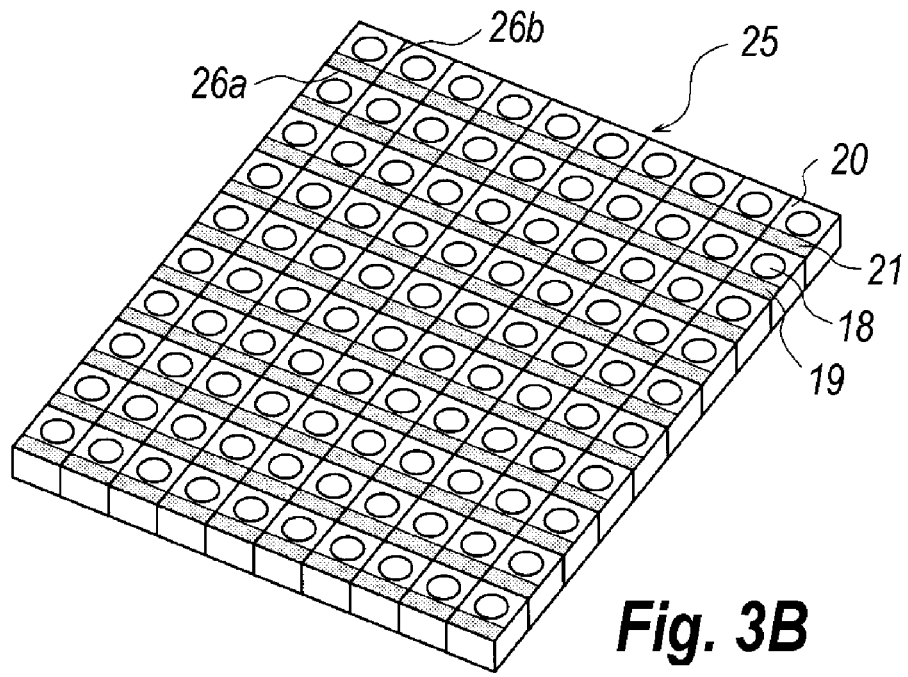
FIG. 3B shows a process to form the lens assembly shown in FIG. 3A.

The lens assembly 16a may be collectively formed as shown in FIG. 3B by a mold specific to the lens 18, or sometimes by a process generally applicable to the semiconductor. The substrate 25 may be made of compound glass, silica glass, semiconductor typically silicon (Si), and so on. The lens 18 may be coated with a low reflective film to reduce the optical coupling loss at the surface of the lens 16.

The substrate 25 also has the metal 21 along a line 26a where the process to form the lens assembly 16a divides respective chips along another line 26b. These lines, 26a and 26b are often called as dicing lines. The metal 21 may be a stacked metal of, for instance, nickel and aluminum (Ni/Au), titanium, platinum and gold (Ti/Pt/Au) to make the sharing tolerance consistent with the wettability of the solder. The process divides respective lens assemblies 16a by cutting the substrate 25 along the dicing lines, 26a and 26b.

Figure 4A:
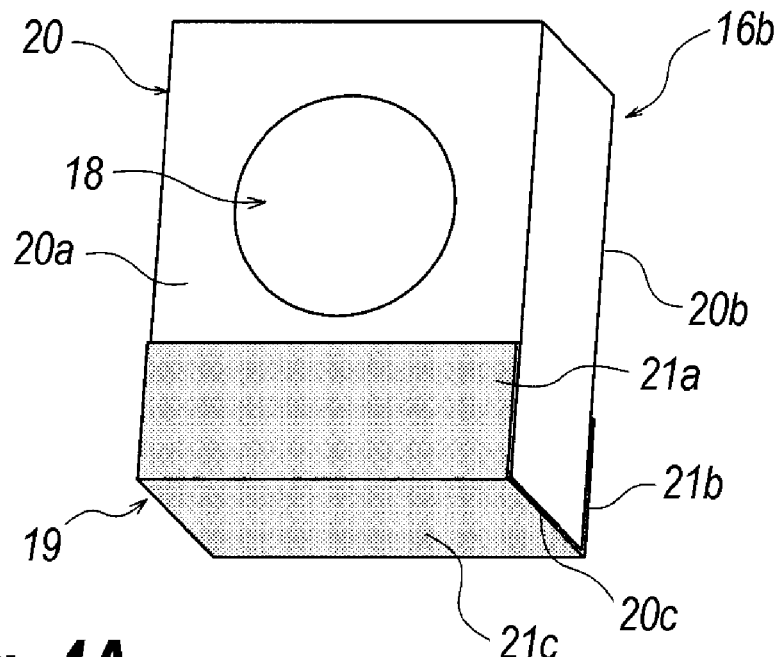
FIG. 4A shows an individual lens assembly according to another embodiment of the invention.

A modified lens assembly 16b shown in FIG. 4A further prepares a metal 21c, as a portion of the metalized surface 19, in the bottom surface 20c thereof facing the carrier 13 in addition to the metals, 21a and 21b, in the front and rear surfaces, 20a and 20b, thereof. The lens assembly 16b may be soldered with and fixed to the area 13b on the carrier 13 by the bottom 20c, which may increase the soldered area to enhance the sharing tolerance.

Figure 4B:
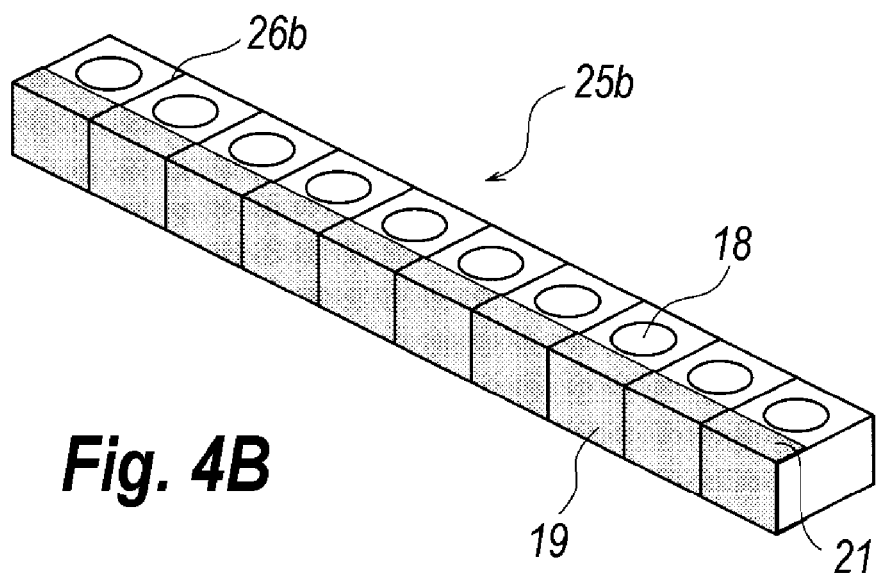
FIG. 4B shows a process to form the lens assembly shown in FIG. 4A.

FIG. 4B shows an chip bar 25b that includes an array of the lens assembly 16b. The metals, 21a and 21b, provided on the front and rear surfaces, 20a and 20b, may be formed as those described in FIG. 3B, while, the metal 21c in the bottom surface 20c may be formed after the substrate 25 is divided into chip bars 25b by cutting only along the dicing lines running in parallel to the metal 21a, which exposed the bottom surface 20c of respective lens assemblies 16b.

Figure 5A:
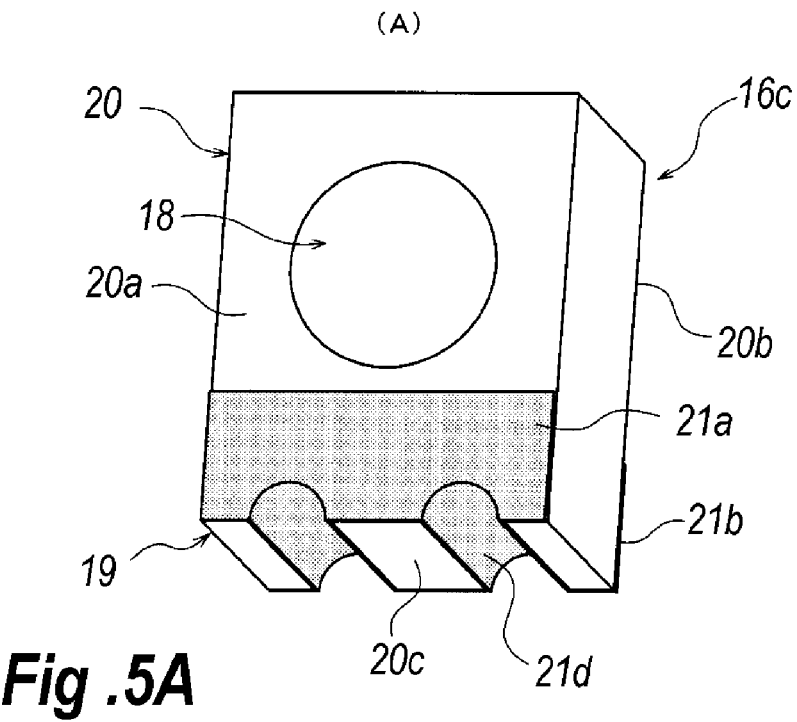
FIG. 5A shows an individual lens assembly according to still another embodiment of the invention.

FIG. 5A shows an arrangement of still modified embodiment of the lens assembly 16c, which has a hollowed portion in the bottom surface 20c thereof and a metal covers, not only the front and back surfaces, 20a and 20b, and the bottom surface 20c but an inside of the hollowed portion 21d. Solders filling the hollowed portion may strengthen the sharing tolerance to secure the fixation of the lens assembly 16c on the carrier 13.

Figure 5B:
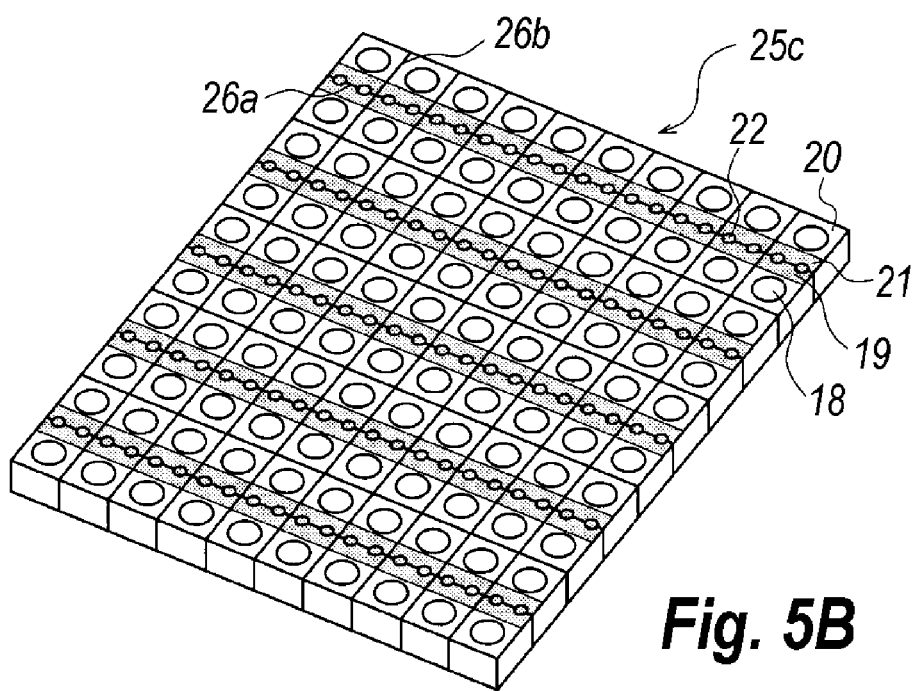
FIG. 5B shows a process to form the lens assembly shown in FIG. 5A.

The lens assembly 16c may be formed in a same manner with those aforementioned embodiments. A substrate 25 prepares an array of lens assemblies 16c, and the metal 21 covers portions of the front and rear surfaces, 20a and 20c. A feature of the process shown in FIG. 5B is that the metal 21 for the metalized surface 19 has a plurality of holes 22 along one of the dicing lines 26a. Dividing respective lens assemblies along the dicing line 26a, the bottom surface 20c with hollowed portion may appear. Then, metalizing the bottom surface 20c and further dividing the bar into respective lens assemblies 16c, the process may form the lens assembly 16c shown in FIG. 5A.

FIGS. 6A to 6C show still other modifications of the lens assemblies, 16d to 16e. These lens assemblies, 16d to 16f, provide a mechanism to be picked up by tools prepared in an apparatus to place a component on a table such as the carrier 13. Tools mentioned above are, for instance, tweezers, collet, pincette, and so on. The lens assembly 16d shown in FIG. 6A is applicable to an apparatus implementing with a vacuum collet that sticks slant surfaces 23a to lift the lens assembly 16d up.

Another lens assembly 16e shown in FIG. 6B has a knob between the steps 23b in the top surface 20d thereof. When an apparatus to assemble the lens assembly provides a collet with a pair of legs, the legs may put the steps therebetween to lift the lens assembly 16e up. FIG. 16C shows still another embodiment of the lens assembly 16f, which provides a pair of grooves in respective side surfaces. Fitting a tip of the collet with the groove, the lens assembly 16c may be lifted up and conveyed precisely.

Figure 7:
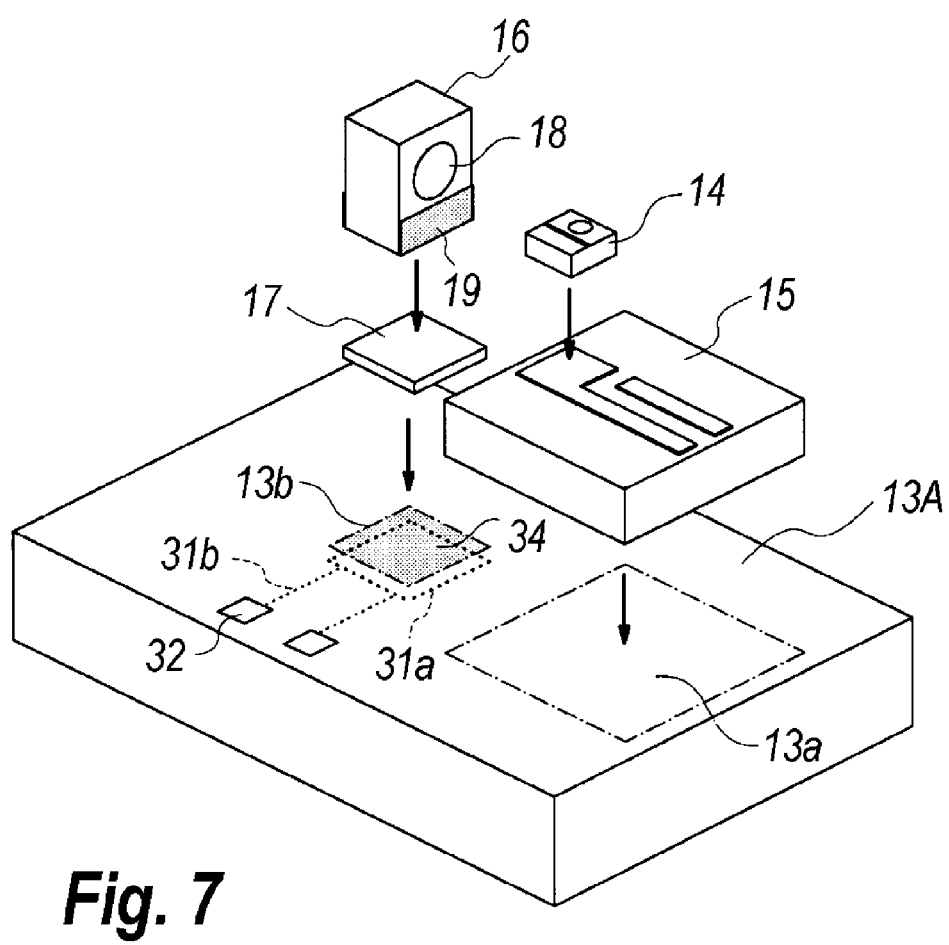
FIG. 7 is an exploded view showing a process to form a primary portion of the optical module according to another embodiment of the invention.

FIG. 7 is an exploded view showing another embodiment of the carrier 13A. The carrier 13A shown in FIG. 7 may be made of electrically insulating or semi-insulating material such as aluminum nitride (AlN), ceramics such as alumina ($Al_2O_3$), and semiconductor material such as silicon (Si), gallium nitride (GaN), and so on. The carrier 13A provides an area 13a to mount the sub-mount 15 thereon, and another area 13b to mount the lens assembly 16.

These areas, 16a and 16b, may form a metal layer made of a stack of Ni/Au, Ti/Pt/Au and so on to make the sharing tolerance consistent with the wettability of the solder. The metal 34 provided in the area 13b for the lens assembly 16 is wider than an area of the bottom surface 20c of the lens assembly 16 by a sum of the alignment tolerance and a size of the solder fillet. In order to couple light emitted from the LD 14 to the external fiber, the alignment tolerance applicable to the lens is about few micron-meters, and that for the LD 14 and the external fiber are several tens of micron-meters to several hundreds of micron-meters; then allowable acceptable alignment tolerances becomes several hundreds of micron-meters. When the metal 34 is formed in excessively wider, the solder between the metal 34 and the lens assembly 16 extends wider, and the solder fillet may be not formed, which results in a lesser sharing tolerance.

When the carrier 13A is made of insulating and thermostable material, the carrier 13A may provide a heater to melt the solder sheet 17. The heater 31 formed in immediate beneath the metal 34 in the area 13b accompanies with the wiring 31b to supply currents to the heater 31a from the electrical pads 32. Supplying the current to the heater 31a, the metal 34 and the solder sheet 17 may be locally heated up to melt the solder sheet 17, which may enhance the productivity of the lens assembly 16.

FIGS. 8A to 8C show embodiments when the carrier 13 is made of aluminum nitride (AlN). When the carrier 13 is made of electrically insulating material, such as AlN, the heater 31a, the wiring 31b, and the pad 32 may be formed directly on the carrier 13. The heater 31a has the resistance R defined by:

$$R(\Omega) = \rho(L/A),$$

where L, A, and $\rho$ are a length (m), a cross section ($m^2$), and the resistivity ($\Omega m$) of a material constituting the heater 31a, respectively.

The heater 31a may be made of material with higher resistivity $\rho$. For instance, titanium (Ti) whose resistivity is $4.27 \times 10^7$ $\Omega m$, chromium (Cr) with the resistivity of $1.29 \times 10^7$ $\Omega m$, and/or platinum (Pt) with the resistivity of $1.04 \times 10$ $\Omega m$ are applicable to the heater 31a. The heater 31a, the wiring 31b, and the pad 32 may be formed by a conventional semiconductor process such as the metal evaporation, the metal sputtering, and so on. A zigzag pattern of the heater 31a may increase the resistance thereof.

In an example, applying Ti to the heater 31a, and assuming the thickness, the width, and the length thereof are 1 μm, 100 μm, and 5 mm, respectively; the resistance becomes 21.4Ω. Providing a current of 1 ampere to the heater 31a, the power Q generated by the heater 31a becomes ($Q = I^2 R$) 21.25 W. Further assuming the thermal resistance $R_{TH}$ from the heater 31a to the bottom of the carrier 13 is 10 (° C./W), the rise of the temperature $\Delta T$ becomes ($\Delta T = Q \cdot R_{TH}$) 213.5° C. Thus, when the bottom of the carrier 13 is exposed to a room temperature 25° C., the rise of the temperature just on the heater 31 becomes 238.5° C., which enables to melt the eutectic solder of SnAg whose melting point is 217° C.

The heater 31a preferably has large resistivity to get enough power, while, the wiring 31b is necessary to have the resistivity as low as possibly to reduce an excess electrical loss thereat. Accordingly, the wiring 31b preferably has a wider and thicker dimensions, and/or it is made of gold (Au), copper (Cu), or other metal stacked with Au and/or Cu.

The heater 31a is surrounded by electrically insulating material 33, which may be made of, for instance, evaporation and/or sputtering. The insulating material 33 is thin enough and made of material with good thermal conductivity, such as silica glass ($SiO_2$), to conduct heat from the heater 33a to the metal 34.

As shown in FIG. 8B, formed on the insulating material 33 is the metal layer 34 made of material, for instance, Ni/Au and/or Ti/Pt/Au, making the sharing tolerance of the lens assembly 16 consistent with the solder wettability. The metal layer 34 may be formed by plating. FIG. 8C is a cross section of the heater 31 and the metal layer 34 on the heater 31.

Figure 9A:
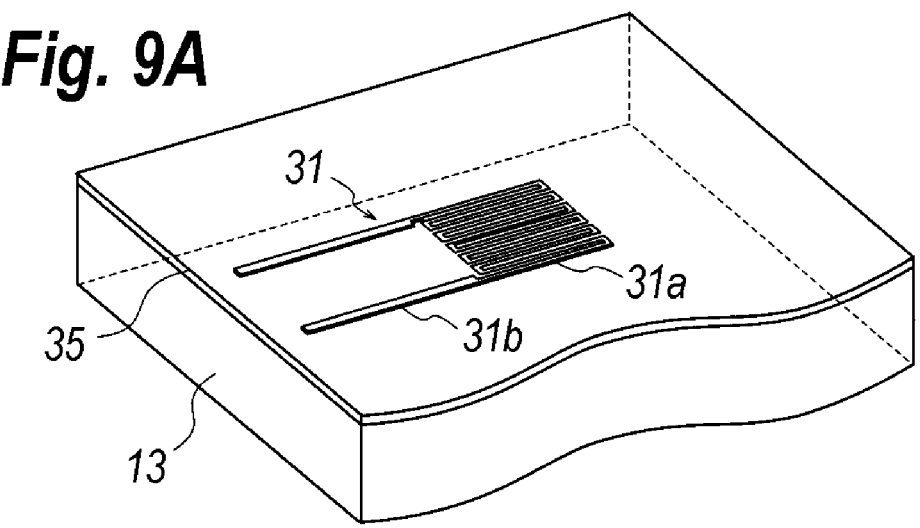
FIGS. 9A and 9B are perspective vies of the carrier according to still another embodiment of the invention.

In another embodiment, the carrier 13 may be made of semiconductor material, such as Si, GaN and so on. As shown in FIG. 9A, in a case the carrier 13 is made of semiconductor material, an electrically insulating layer 35, which may be made of $SiO_2$ and/or polyimide, first covers the whole surface of the carrier 13. Then, similar to the aforementioned embodiment, the heater 31 and another insulating layer are formed thereon.

Figure 9B:
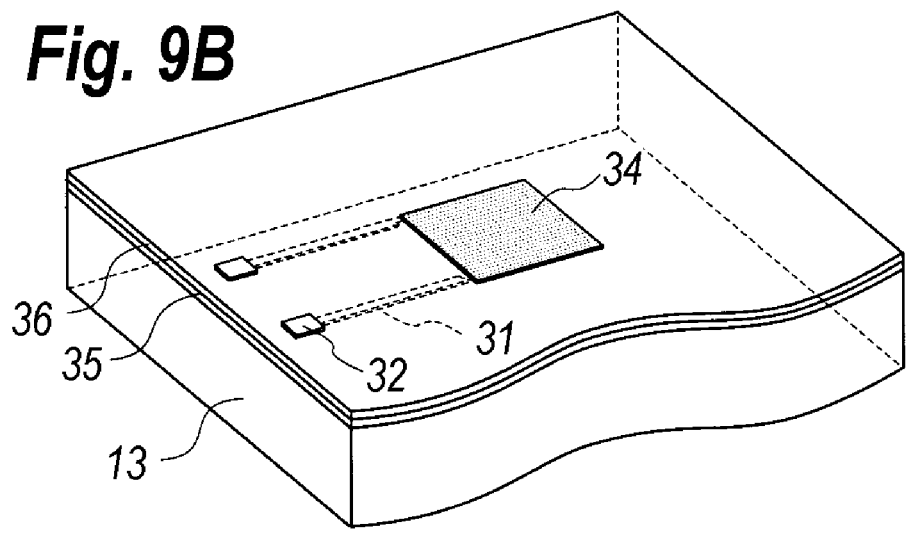
Figure 9C:
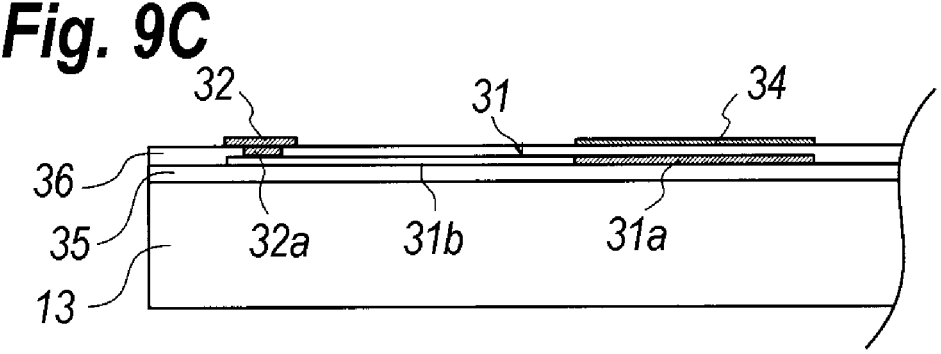
FIG. 9C shows a cross section thereof.

Specifically, the heater 31a and the wiring 31b are formed on the first insulating layer 35; then the other insulating layer 31 covers the whole surface of the carrier 13 including the heater 31. Making an opening 32a to reach the wiring and depositing not only the metal layer 34 but another metal 32 to cover a portion surrounding the opening 32a, which is electrically isolated from the metal layer 34, the heater structure shown in FIGS. 9A and 9B is completed. FIG. 9C is a cross section of the heater 312 shown in FIGS. 9A and 9B.

Figure 10A:
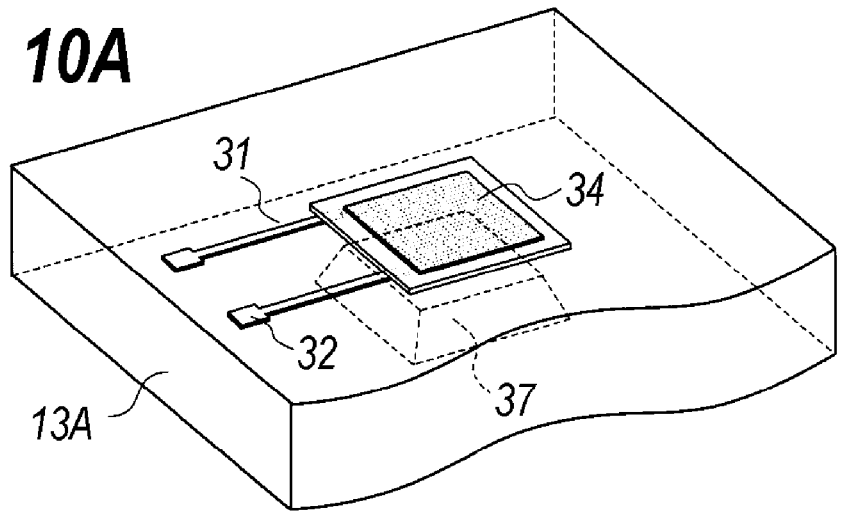
FIGS. 10A and 10B are perspective views of the carrier according to still another embodiment of the invention.
Figure 10B:
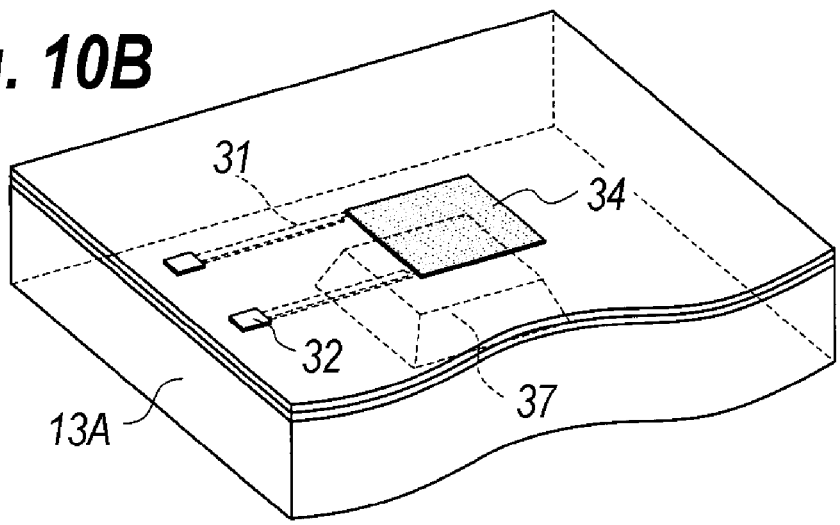
Figure 10C:
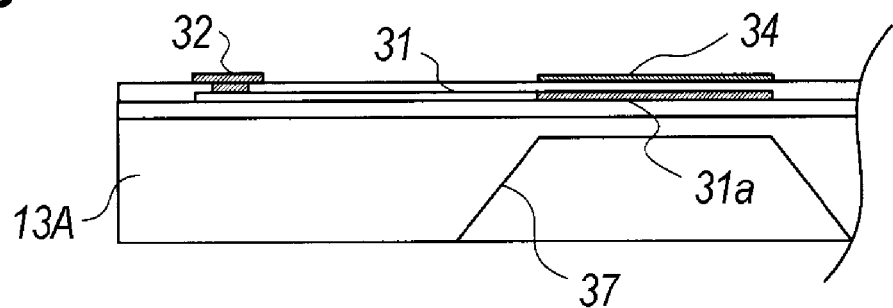
FIG. 10C shows cross section thereof.

FIGS. 10A to 10C show still modified embodiment of the heater 31. When the carrier 13 is made of material with good thermal conductivity, the heat generated by the heater 31 may be not only conducted to the metal layer 34 but dissipated through the carrier 13, which decreases the rise of the temperature at the metal layer 34 and lowers the soldering efficiency. The embodiment shown in FIGS. 10A to 10C provides in the carrier 13A thereof a hollow 37 in the back surface of the carrier 13A. The hollow 37 may enhance the thermal resistivity under the heater 31 and lower the heat dissipation therefrom to enhance the soldering efficiency on the metal layer 34.

An arrangement shown in FIG. 10A corresponds to a case where the carrier 13A is made of ceramics corresponding to the embodiment shown in FIGS. 8A to 8C. In this case, the hollow 37 may be formed concurrently with the burning of the ceramics. While, the arrangement shown in FIG. 10B corresponds to the carrier 13A made of semiconductor material, where the hollow may be formed by the semiconductor processing such as the dry-etching. When the first insulating material 35 has an enough thickness, the hollow 37 may reach the first insulating material 35, that is, the carrier 13A in a bottom of the hollow 37 may be fully removed.

Figure 11A:
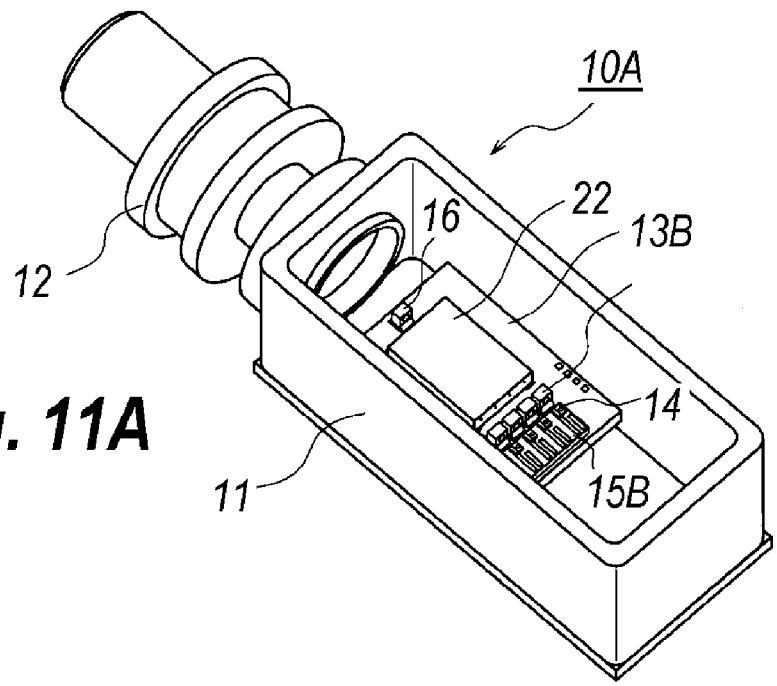
FIG. 11A is a perspective view showing an optical module according to another embodiment of the invention.
Figure 11B:
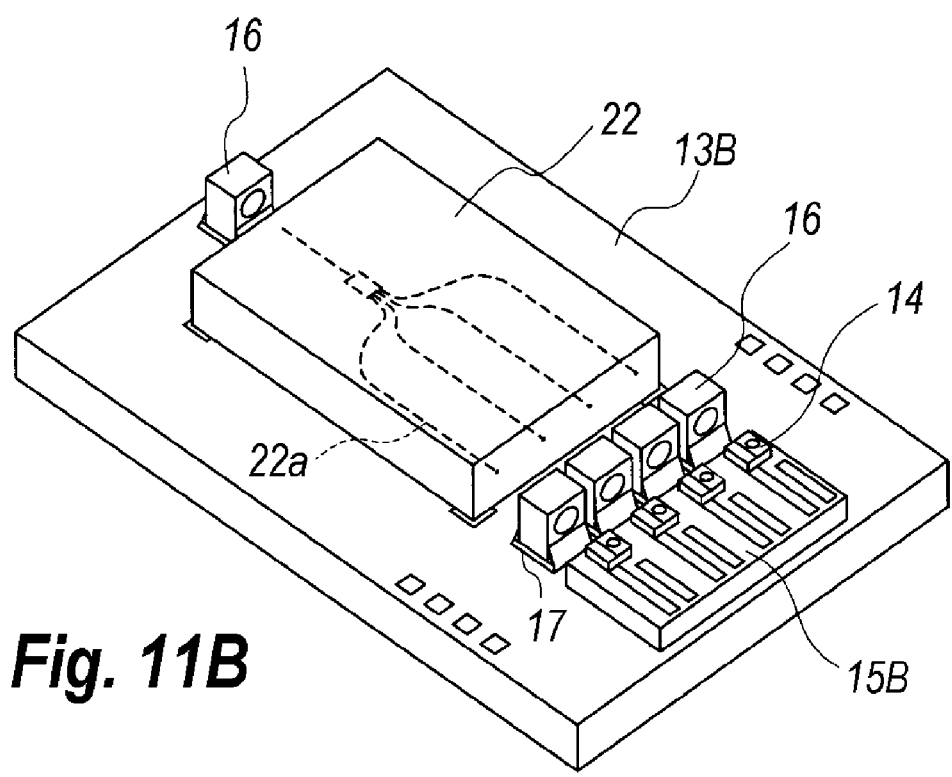
FIG. 11B is a perspective view showing the primary portion of the module installed therein.

FIG. 11A is a perspective view of a still another embodiment of an optical module 10A, while, FIG. 11B is a perspective view showing a primary portion of the optical module 10A installed therein. The primary portion shown in FIG. 11B includes a plurality of LDs 14, four (4) LDs 14 are implemented therewith, each emitting light of a specific wavelength different from others, and an optical coupler 22 to multiplex the plural light. The optical module 10A may transmit thus multiplexed light into a single fiber.

The light emitted from respective LDs 14 enters respective waveguide 22a in the multiplexer 22 after it is independently concentrated by the lens 18 in the lens assembly 16. The multiplexed light output from the multiplexer 22 is concentrated by another lens assembly 16 to enter the single fiber. The carrier 13B may mount these components of the lens assemblies and the LDs 14 via the sub-mount 15B.

The lens assembly 16 on the carrier 13B may be independently soldered and fixed to the carrier 13B as those of the aforementioned embodiments after it is optically aligned with the LD 14, the waveguide 22a in the multiplexer 22, and the single fiber. When the optical module 10A of the embodiment has the box housing 11 same with that shown in FIG. 1A, the box housing 11 may not secure an inner space to install a plurality of LDs 14, the lens assemblies 16 and so on. Accordingly, the optical components installed therein are necessary to be tightly assembled or mounted on the carrier 13b as close as possible. Then, the YAG laser welding, which is quite popular technique to fix the components without distorting once aligned positional relation thereof, is unable to be used because an excess space around the components can not secure. Then, a technique and method to fix the component to the carrier by the solder sheet 17 may be usable.

I claim:

1. An optical module, comprising:
at least one semiconductor optical device;
at least one lens assembly optically coupled with the semiconductor optical device; and
a carrier made of ceramics for mounting the optical device and the lens assembly,
wherein the lens assembly has a metalized surface fixed to the carrier by a solder,
wherein the carrier provides a metal layer and a heater in a portion where the lens assembly is soldered, and
wherein the carrier has a hollow in a portion of a back surface opposite to a surface to mount the lens assembly, a portion of the hollow corresponding to the heater.

2. The optical module of claim 1,
wherein the lens assembly has the metalized surface at least in a side thereof,
wherein the solder forms a solder fillet on the metalized surface.

3. The optical module of claim 2,
wherein the lens assembly has the metalized surface in a bottom thereof facing the carrier.

4. The optical module of claim 1,
wherein the lens assembly has a structure to be grasped in a top portion thereof opposite to the carrier.

5. An optical module comprising:
a semiconductor optical device;
a lens assembly optically coupled with the semiconductor optical device; and
a carrier made of semiconductor material with an insulating layer in a surface thereof,
wherein the lens assembly has a metalized surface fixed to the carrier by a solder, and
wherein the carrier provides a heater on the insulating layer and a metal layer on the heater as putting another insulating layer therebetween, the metal layer soldering the lens assembly thereto.

6. The optical module of claim 5,
wherein the carrier has a hollow in a portion of a back surface opposite to the surface for mounting the lens assembly corresponding to the heater.

7. The optical module of claim 6,
wherein the carrier within the hollow thereof is fully removed for the hollow to reach the insulating layer.

8. The optical module of claim 1,
wherein the semiconductor optical device is a semiconductor laser diode (LD).

9. An optical module, comprising:
a plurality of semiconductor laser diodes (LDs);
a plurality of lens assemblies optically coupled with LDs and having metalized surfaces;
a carrier for mounting the LDs and the lens assemblies thereon;

an optical multiplexer to multiplex optical signals each emitted from respective LDs and passing through the lens assemblies, wherein the carrier directly mounts the lens assemblies by soldering the metalized surface and the optical multiplexer, but indirectly mounts the LDs through respective sub-mounts.

10. The optical module of claim 9, wherein the lens assemblies are tightly arranged on the carrier.

11. The optical module of claim 9, wherein the lens assemblies each has the metalized surface at least in a side thereof, and wherein the solder forms a solder fillet on the metalized surface.

12. The optical module of claim 11, wherein the lens assemblies each has the metalized surface in a bottom thereof facing the carrier.

13. The optical module of claim 9, wherein the lens assemblies each has a structure to be grasped in a top portion thereof opposite to the carrier.

* * * * *